United States Patent [19]

Wright

[11] Patent Number: 5,184,238

[45] Date of Patent: Feb. 2, 1993

[54] APPARATUS FOR PROJECTING LIGHT ONTO A SURFACE HAVING REFLECTOR MEANS FOR IMPROVING THE BRIGHTNESS OF THE IMAGE

[75] Inventor: Graham L. Wright, Ickenham, England

[73] Assignee: Thorn Emi plc, London, England

[21] Appl. No.: 797,036

[22] Filed: Nov. 25, 1991

[30] Foreign Application Priority Data

Nov. 30, 1990 [GB] United Kingdom ............ 9026151.2

[51] Int. Cl.[5] .......................... G02F 1/13; G03B 21/26
[52] U.S. Cl. ........................................ 359/70; 359/48; 359/69; 359/71; 353/37
[58] Field of Search ............... 359/37, 40, 42, 48, 359/69, 70, 449, 459, 49, 71; 353/30, 34, 37; 358/60

[56] References Cited

U.S. PATENT DOCUMENTS

| | | | |
|---|---|---|---|
| 3,941,467 | 3/1976 | Kapany et al. ..................... | 353/34 |
| 3,947,091 | 3/1976 | Treka ................................. | 359/70 |
| 4,033,672 | 7/1977 | Dalmasso ........................... | 359/42 |
| 4,708,439 | 11/1987 | Ishii et al. .......................... | 359/40 |
| 4,822,145 | 4/1989 | Staelin ............................... | 359/40 |
| 4,913,528 | 4/1990 | Hasegawa .......................... | 358/60 |
| 5,048,949 | 9/1991 | Sato et al. .......................... | 359/40 |

FOREIGN PATENT DOCUMENTS

| | | | |
|---|---|---|---|
| 0056843 | 8/1982 | European Pat. Off. ............ | 359/42 |
| 0240045 | 10/1987 | European Pat. Off. . | |
| 0333333 | 9/1989 | European Pat. Off. . | |
| 136899 | 12/1902 | Fed. Rep. of Germany . | |
| 2552278 | 5/1977 | Fed. Rep. of Germany ....... | 359/42 |
| 0083498 | 7/1978 | Japan ................................. | 359/70 |

Primary Examiner—Andrew J. James
Assistant Examiner—Huy K. Mai
Attorney, Agent, or Firm—Keck, Mahin & Cate

[57] ABSTRACT

A display device in the form of a slim screen projector has a beam-splitter and a reflector co-planar and in contact with each other. Incident light from a light source strikes the beam-splitter and reflector and a portion thereof is directed towards a mirror. Light from the mirror then passes through a louvre-screen via the beam-splitter and strikes a viewing surface on which a viewable image is formed.

8 Claims, 4 Drawing Sheets

APPARATUS FOR PROJECTING LIGHT ONTO A SURFACE HAVING REFLECTOR MEANS FOR IMPROVING THE BRIGHTNESS OF THE IMAGE

The present invention relates to apparatus for projecting light onto a viewing surface and has particular, though not exclusive, relevance to equipment for use in a rear-projection image display, such as a liquid crystal television display.

Published European Patent Application number 0 333 333 discloses a display device including equipment for projecting light onto a surface. The equipment includes a beam-splitter for effecting partial reflection and partial transmission of an incident beam. On one side of the beam-splitter are a light source for directing light onto the beam-splitter and a mirror for directing back towards the beam-splitter light reflected therefrom. On the other side of the beam-splitter is a louvre for permitting passage therethrough of light of incident angle relative to a normal to the beam-splitter within a predetermined restricted range.

However, whilst the above system achieves a substantially slimmer device than was previously known for the viewing area achieved, it has a relatively low overall optical efficiency.

It is thus an object of the present invention to provide a slim equipment for the projection of light onto a viewing surface with a substantially increased optical efficiency as compared with the display device detailed in EPA 0333,333.

Accordingly there is provided apparatus for projecting light onto a surface comprising:

a light source for providing polarised light;

beam-splitting means for effecting partial reflection and partial transmission of light incident thereon from the light source;

reflector means for reflecting light incident thereon from the light source;

mirror means for directing towards the beam-splitting means light reflected from the beam-splitting means and also light reflected from the reflector means; and louvre means located on a side of the beam-splitting means remote from the light source for allowing the passage of light therethrough in a predetermined range of incident angles relative to the beam-splitting means.

The prior art device, which had no reflector means, was susceptible to a loss of light at this stage due to only partial reflection from the beam-splitter means. Furthermore, inclusion of the reflector means produces a narrowing of incident angles for light directly incident upon the beam-splitting means as compared with the prior art device, and thus by arranging for linearly polarised light to be incident upon the beam-splitting means, a higher component of light reflected therefrom, as opposed to transmitted therethrough, is achieved.

Preferably, the polarised light source comprises a liquid crystal display. Generally, light passing through a liquid crystal display becomes plane polarised and is thus clearly well suited for employment within the present invention.

Preferably, the liquid crystal display comprises separate displays for each of the primary colours; red, green and blue.

In a preferred embodiment of the present invention, the reflector means comprises an optical surface having a non-uniform reflectivity. This allows for compensation of the image at the lower portion of the viewing surface so that it matches the brightness on the upper portion of the viewing surface.

Preferably the non-uniform reflectivity across the optical surface is achieved by way of an arrangement of areas of dots having lower reflectivity than the optical surface.

Alternatively, or additionally, the device may include a variable neutral density filter in order to compensate for the variation in image intensity across the viewing surface.

In an embodiment of the present invention comprising a liquid crystal display, the compensation for varying intensity at the viewing surface may be achieved by inclusion of a partial mask over the display or the beam-splitter or any position in between. Such a mask may be applied to each individual pixel of the liquid crystal display.

The invention will now be described, by way of example only, with reference to the following drawings, of which:

Figure 1:
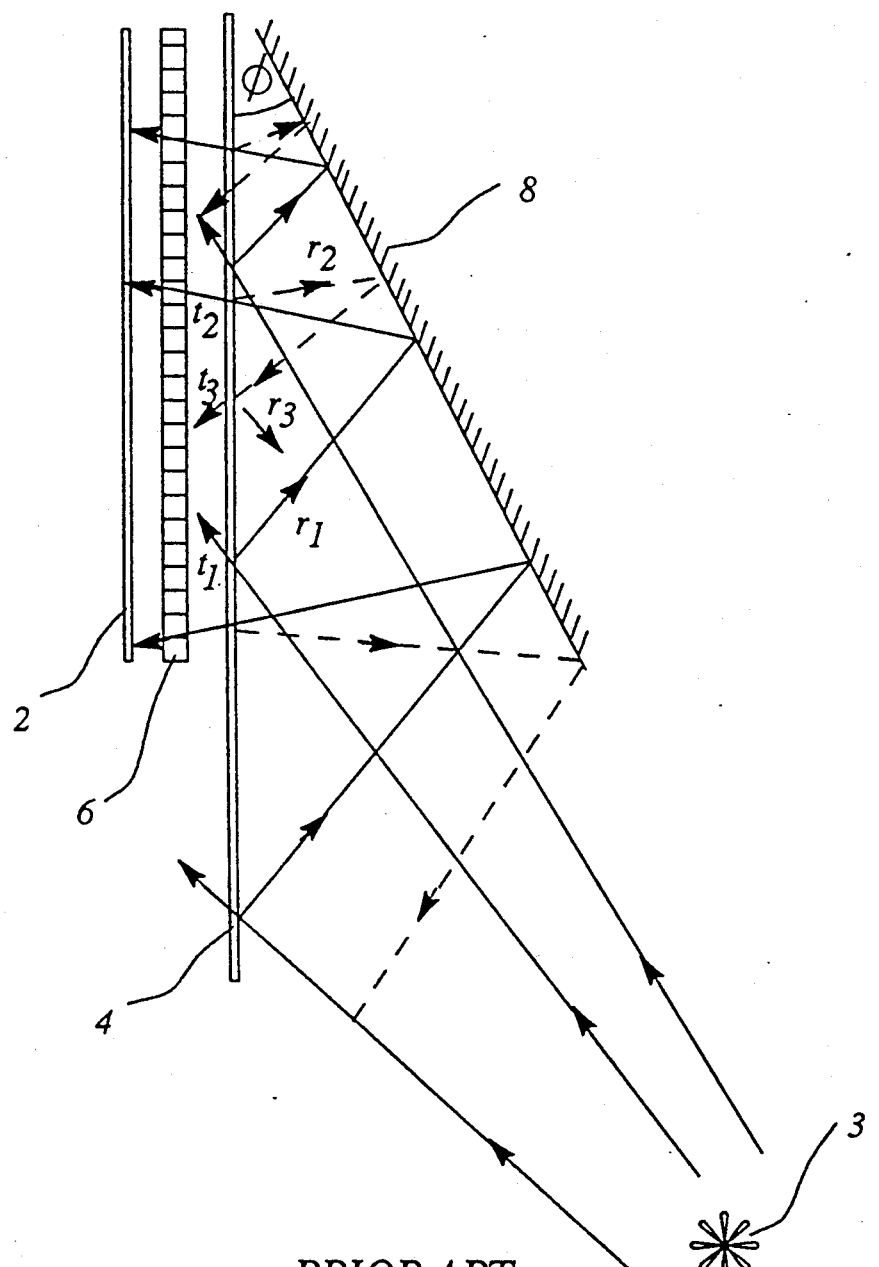
FIG. 1 represents a schematic illustration of a prior art display device.

Referring firstly to FIG. 1, the prior art device comprises a diffuser plate 2 effective as a viewing surface, which is illuminated from the rear by a light source 3. The light source directs a beam of light onto a beam-splitter 4 which produces a reflected portion $r_1$ and a transmitted portion $t_1$, the transmitted portion $t_1$ of this beam passing on to a louvred plate 6 where it is absorbed as its direction is at a substantial angle to the transmission direction of the louvre, i.e., that direction at which the louvre permits passage of light by virtue of the orientation of the louvre 6 to that incident light. The portion $r_1$ of this beam, which is first reflected by the beam-splitter 4, passes to a mirror 8 disposed at an angle $\phi$ to the beam-splitter 4, the mirror 8 directing reflected portion $r_1$ back towards the beam-splitter 4. This time, a portion $t_2$ is transmitted by the beam-splitter 4 and is subsequently incident on the louvred plate 6 at an angle within a predetermined restricted range such that is passes therethrough and onto the diffuser plate 2; the portion $r_2$ which is reflected is subsequently directed back by mirror 8 towards the beam-splitter 4. Any portions subsequently transmitted through the beam-splitter 4 are either at an angle at which passage through the louvre 6 is inhibited, or of very low intensity, thereby having no or minimal effect on the illumination of diffuser plate 2.

Figure 2:
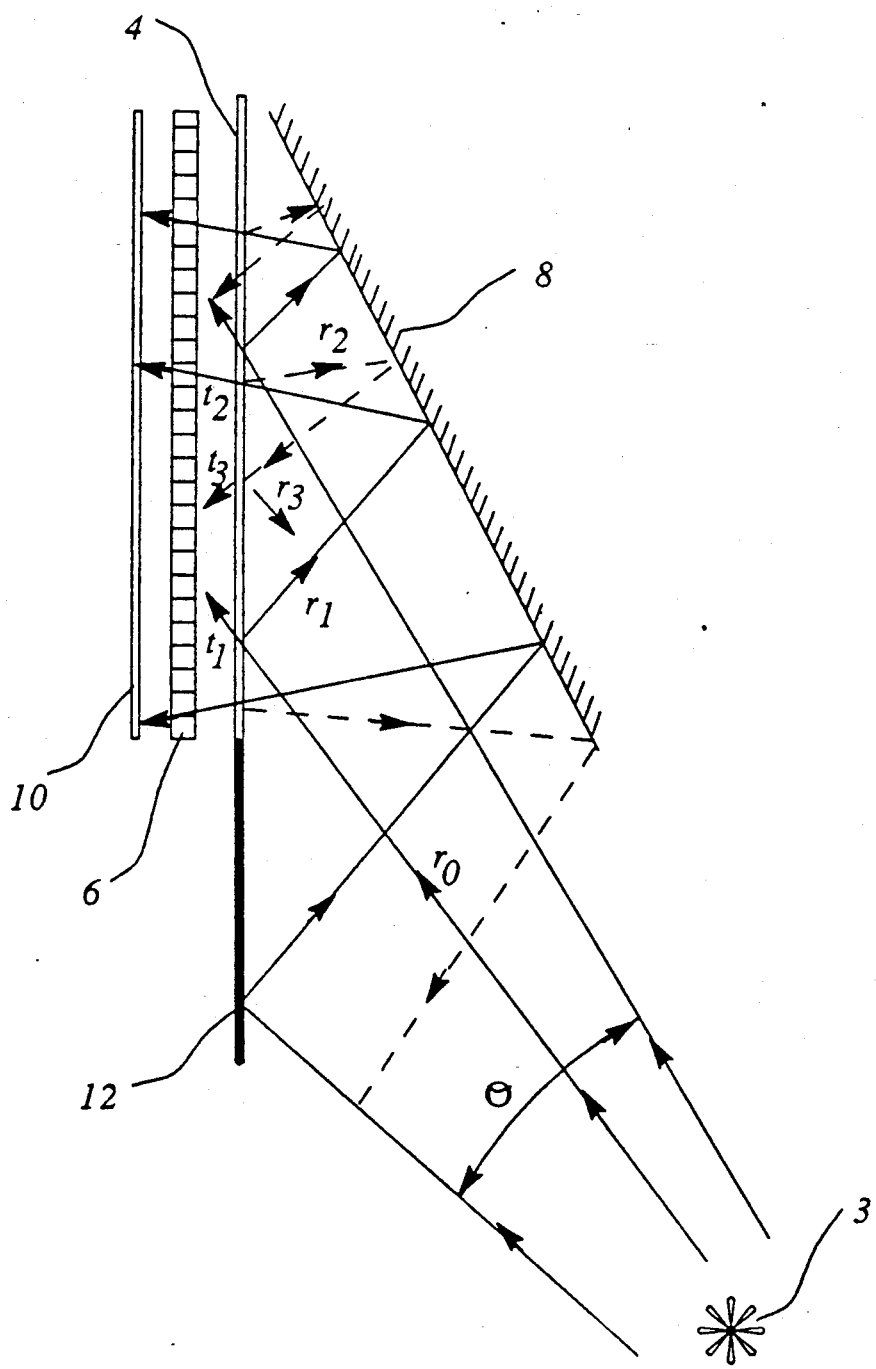
FIG. 2 represents a schematic illustration of a display device according to the present invention.

Referring now to FIG. 2, this embodiment of the present invention illustrates how a greater proportion of the light transmitted from the light source may be incident on a viewing surface 10, which viewing surface was in the form of a diffuser plate 2 in the prior art device. Similar components are similarly numbered.

Light incident from a light source 3 is arranged to be polarised before being incident upon a reflector means 12 and the beam-splitting means 4. This may be achieved by passing light through a polarising plate. The orientation of the plane of polarised light may be altered by passing the light through a liquid crystal material such as is commonly used in liquid crystal displays. It will be apparent to those skilled in the art that such plane polarised light may be arranged to have the electric vector either parallel or perpendicular to the plane of incidence, and such polarisation states are referred to respectively as p and s polarised light. These terms are well known by persons skilled in this art and will not, therefore, be described further in the present application.

By reference to FIG. 2, it will be seen that by including a reflector means 12 immediately below and in contact with the beam-splitting means 4, all incident light thereupon is reflected to mirror means 8 and subsequently onto the beam-splitter means 4 at very low incidence angles, whereby the proportion of light from the reflector 12 passing through the beam-splitter 4 and louvre 6 and onto the viewing surface 10 is maximised. It will be seen that such light is incident only upon the lower portion of the beam-splitter 4 and thus an observer of the viewing surface 10 would see an image having a step function of intensity, the image being much brighter at the bottom portion of the viewing surface 10 than at the top portion not influenced by the reflector 12.

In order to correct for this enhanced brightness at the bottom portion of viewing surface 10, the reflector 12 may be arranged to have a variation in reflectivity across its optical surface. This is achieved by arranging for the optical surface of the reflector 12 to have a non-uniform reflectivity.

There are several alternatives available for suitable choice of reflector 12 and for the compensation which may be required to be applied thereto in order to correct for the step function mentioned above.

Figure 3:
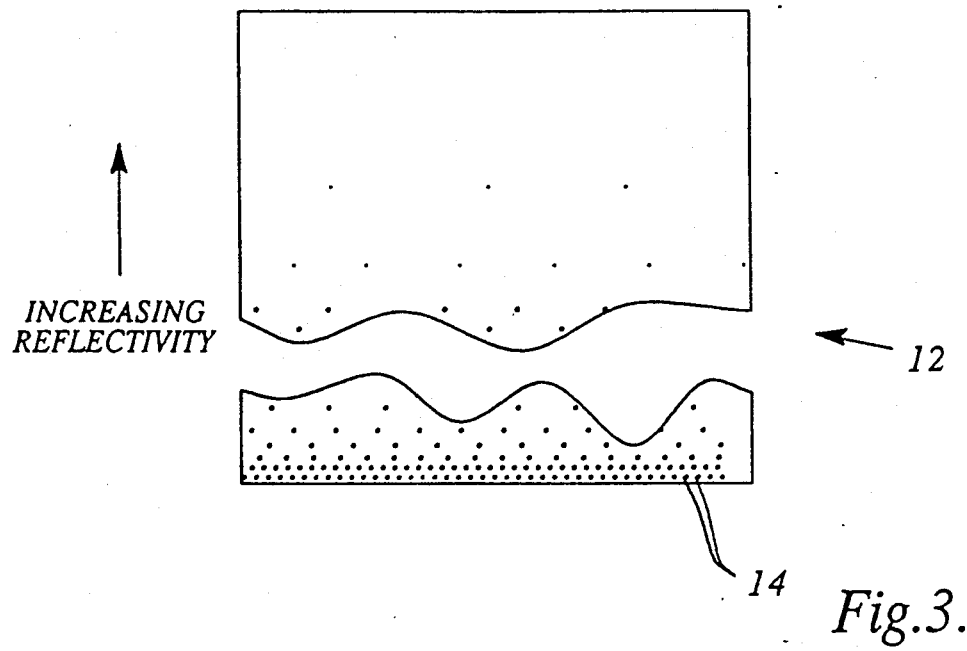
FIG. 3 represents a variation of reflection coefficients with incident angle for plane polarised light associated with the beam-splitter of the present invention.

A prefered form of reflector 12 is that of the substrate coated with, for example, a layer of aluminium. The compensation may be in the form of areas of dots 14 of lower reflectivity than the optical surface of the reflector 12 as for example shown in FIG. 3. Such dots do not necessarily need to be of particularly small dimensions, they could for example be of up to about 0.1 mm diameter in order to function effectively. The spacing and pattern of the dots will be dependent upon the extent to which the brightness must be compensated. Alternatively the reflector 12 may itself be formed from a material of non uniform reflectivity, thus negating the need for dots 14 to be formed on the optical surface of the reflector 12.

Alternatively, a variable neutral density filter could be employed to cover the reflector 12 or, alternatively, the viewing surface 10. If the neutral density filter is arranged on the viewing surface 10, it may be applied to either the front or the rear of the viewing surface. This will adequately compensate for intensity variations across the viewing surface 10, but is not effective for correcting any chromatic abberations which may occur.

Figure 4:
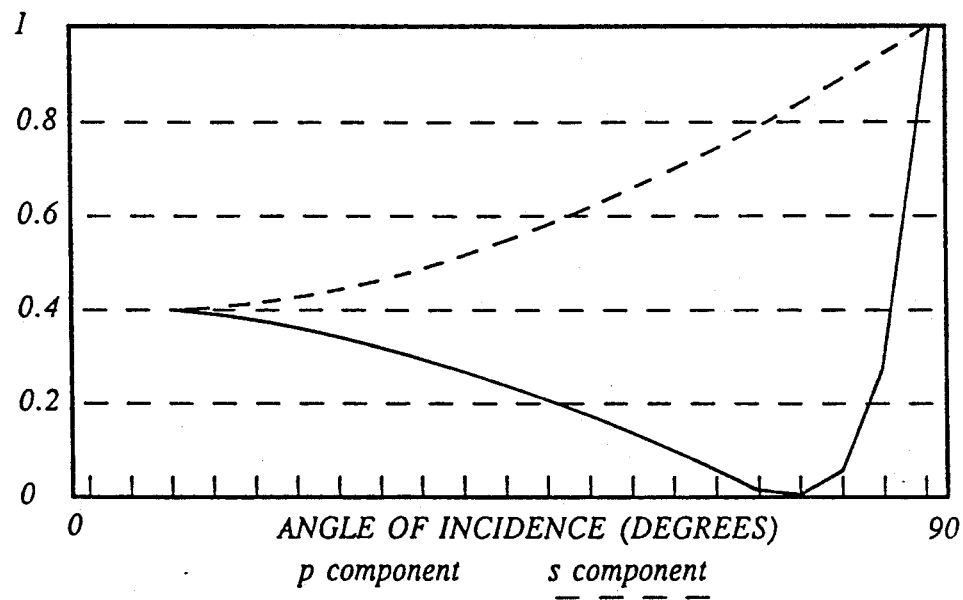
FIG. 4 shows a schematic representation of the reflector means with a non-uniform reflectivity distribution.

It will be seen by referring again to FIG. 2 that inclusion of reflector 12 enables a narrowing of the angles of incidence $\theta$ from the light source onto the beam-splitter 4. FIG. 4 shows, for the beam-splitter 4, the variation of reflection coefficient against angles of incidence for plane polarised light. It will be seen that the greater the angle of incidence of light upon beam-splitting means 4 the greater the s-component of polarisation in the reflected portion $r_1$ (up to the limit of grazing incidence). The converse also holds; i.e., as the angle of incidence decreases the p-component of polarisation in the light reflected from the beam-splitter 4 increases.

Furthermore, as can be seen from FIG. 4, the greater the s-component of the incident light, the greater the coefficient of reflectivity of the beam-splitter 4 and therefore the less the coefficient of transmittivity.

Thus, by predetermining the plane of polarisation of light incident upon the beam-splitter 4 and by restricting the range of angles of incidence of this light on the beam-splitter 4, the energy in reflected portion $r_1$ may be enhanced and that in the transmitted portion $t_1$ reduced.

As previously stated, the provision of the reflector means 12 restricts the range of incident angles of the light incident on the beam-splitter 4. In a preferred form of the invention, the projection system geometry is arranged to provide a rectangular image on the viewing surface 10 with the horizontal edges of the image being of longer length than the vertical edges of the image; that is the image is of 'landscape' format. To provide maximum efficiency for the optical system the plane of polarisation of the light source 3 is chosen to be parallel to a longer edge of the final image. In so doing, all rays from the light source 3 which ultimately form an image on a vertical axis or line running through the centre of the final image will be s-component polarised light during the first and second interactions with the beam-splitter 4. Rays from the light source 3 which form image points off this axis will comprise of polarised light having a mix of s and p components, the proportion of these components being determined by the plane of incidence of these rays relative to the beam-splitter 4 during their interaction with the beam-splitter 4, which in turn determines the said p-components in the reflected light. If the plane of polarisation of the light from the light source 3 is not carefully chosen to provide a pure component of polarisation along the central axis of the final image, which can be either pure s or pure p component but is chosen to be pure s-component to provide maximum intensity in the final image, there would be an imbalance in the perceived brightness from side to side of the final image.

The effect of the reflector 12 is, therefore, two fold. Firstly, the intensity or brightness of the final image on that portion of the viewing surface having its image formed by light reflected from the reflector 12 is increased, when compared to the known device. Secondly, the reflector 12 reduces the range of angles of incidence of the light from the light source falling on the beam-splitter 4, which is this preferred embodiment of the invention allows the lowest value of image intensity of the final image to be maximised and the spread or range in image intensity from one part of the image to another due to the initial reflection of the incident light from the beam-splitter, to be reduced. For example, considering the s-component of polarised light forming the central vertical axis of the final image formed on the viewing surface 10, the lowest initial angle of incidence of any incident light ray on the beam-splitter 4 is increased thereby increasing the intensity of the portion $r_1$. On the second interaction of these rays with the beam-splitter 4 the reflection coefficient is similar for s- and p-components due to the low angle of incidence, as can be seen from FIG. 4. Hence the lowest value of image brightness along this axis is increased and, therefore, the variations in image brightness along this axis is reduced. The beam-splitter 4 is, in one form of the invention a single layer dielectric type beam-splitter and has an anti-reflection coating of magnesium fluoride on one side thereof remote from the mirror 8.

However, multi layer beam-splitters may also be used in the present invention. Both single and multi layer beam-splitters introduce chromatic aberrations since their reflectivity is a function of wavelength; these aberations will generally be most noticeable at the boundary between the lower portion of the image formed by rays which are initially incident on the reflector, and the upper portion which is produced by rays reflected from the beam-splitter.

The variation of reflectivity with wavelength in dielectric beam-splitters increases with the total optical path length in the thin films which produce the beam-splitting effect; thus it is possible to produce a single layer beam-splitter which gives minimal chromatic aberration in this application, whereas a multi layer design will in general produce chromatic aberrations which must be corrected by some method.

A preferred method of correcting such chromatic aberrations, and simultaneously correcting more gross brightness variations, may be understood with reference to a typical LCD projector in which the final image is formed by combining three separate primary coloured images of red, green and blue. By introducing a partial masking plate (which has different transmissions in different regions; i.e., effectively a variable neutral density filter) into each colour channel of the projector prior to the point at which the colours are combined, it will be apparent that it is possible to selectively modify the intensity of each of the primary colours at each point of the final image, and hence, the colour and brightness at each point of the final image. Active matrix displays provide a particularly convenient means of introducing such a partial masking plate since they already include a small light masking area in each pixel to prevent photoactivation of the transistor used to drive a respective pixel of the display. A modification to the mask design would increase the size of this mask selectively on a pixel by pixel basis so that the partial masking plate may be built into the LCD and no additional manufacturing costs would be incurred. However, it should be stressed that there is no absolute requirement to build this effect into the LCD. Those skilled in the art will see how a partial masking plate could be introduced into the colour channels of any suitable projector.

An additional alternative would be to electrically control the transmission of each pixel.

Those skilled in the art will appreciate that two or more of these techniques may be used simultaneously. For example, electrical compensation of pixels alone might prove not to be the best choice since it could suppress the contrast and range of grey levels in the final image. A partial masking plate solution might suffer due to quality control problems on the beam-splitter, requiring masking plates to be customised for each beam-splitter. However, the two techniques might be combined with almost all the correction being achieved with a standard set of masking plates and the remaining correction achieved with programmable electrical compensation.

Figure 5:
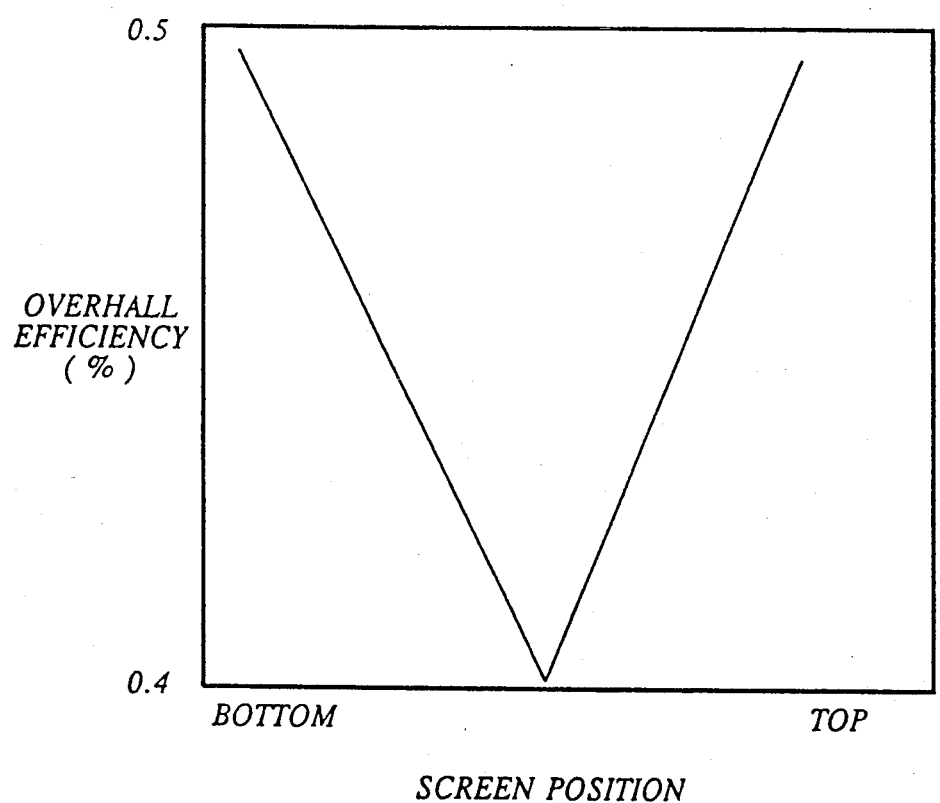
FIG. 5 shows the variation of overall efficiency of the equipment versus the position of the image on the viewing surface.

FIG. 5 illustrates the overall efficiency which the present device aims to achieve. It will be seen that the optical efficiency varies across the viewing surface from the centre to the edges (top and bottom). This occurs because of the variation of angles of incidence of the light from the light source which strikes the beam-splitting means 4, and hence the variation in reflectivity and thus in intensity of light incident upon the viewing screen 10. In normal circumstances, these variations will not be discernable by a viewer of the final image on the viewing surface 10. However, if necessary the variations can be compensated by appropriate design of the neutral density filter and or the partial masking plate referred to above.

It will be apparent that the present invention achieves a substantial increase in optical efficiency as compared with the prior art device by employing a beam-splitter and reflector arranged such that incident polarised light has a greater reflected (and subsequently) viewed component than the prior art.

I claim:

1. Apparatus for projecting light onto a surface comprising:
    a light source for providing polarised light;
    beam-splitting means for effecting partial reflection and partial transmission of light incident thereon from the light source;
    reflector means for reflecting light incident thereon from the light source;
    mirror means for directing towards the beam-splitting means light reflected from the beam-splitting means and also light reflected from the reflector means;
    and louvre means located on a side of the beam-splitting means remote from the light source for allowing the passage of light therethrough in a predetermined range of incident angles relative to the beam-splitting means.

2. Apparatus according to claim 1 wherein the reflector means is arranged to possess a non-uniform optical reflectivity across the optical surface thereof.

3. Apparatus according to claim 2 wherein the non-uniform reflectivity is achieved by an arrangement of areas of dots having lower reflectivity than the optical surface.

4. Apparatus according to claim 1 wherein the light source comprises a liquid crystal display.

5. Apparatus according to claim 4 wherein the liquid crystal display comprises separate displays for each of the the primary colours; red, green and blue.

6. Apparatus according to claim 1 wherein the beam-splitting means and the reflector means are arranged to lie in the same, first plane, and the mirror means is arranged to lie in a second plane at an acute angle with the first plane.

7. Apparatus according to claim 6 wherein the surface onto which the light is projected is located adjacent to the louvre means on a side remote from the light source for enabling viewing of the light transmitted via the louvre means.

8. Apparatus according to claim 1 further including a neutral density filter to compensate for any variation in image intensity across the viewing surface onto which the light is projected.

* * * * *